R. W. SCOTT.
KNITTED WEB.
APPLICATION FILED MAR. 24, 1909.
993,112.
Patented May 23, 1911.
4 SHEETS—SHEET 1.
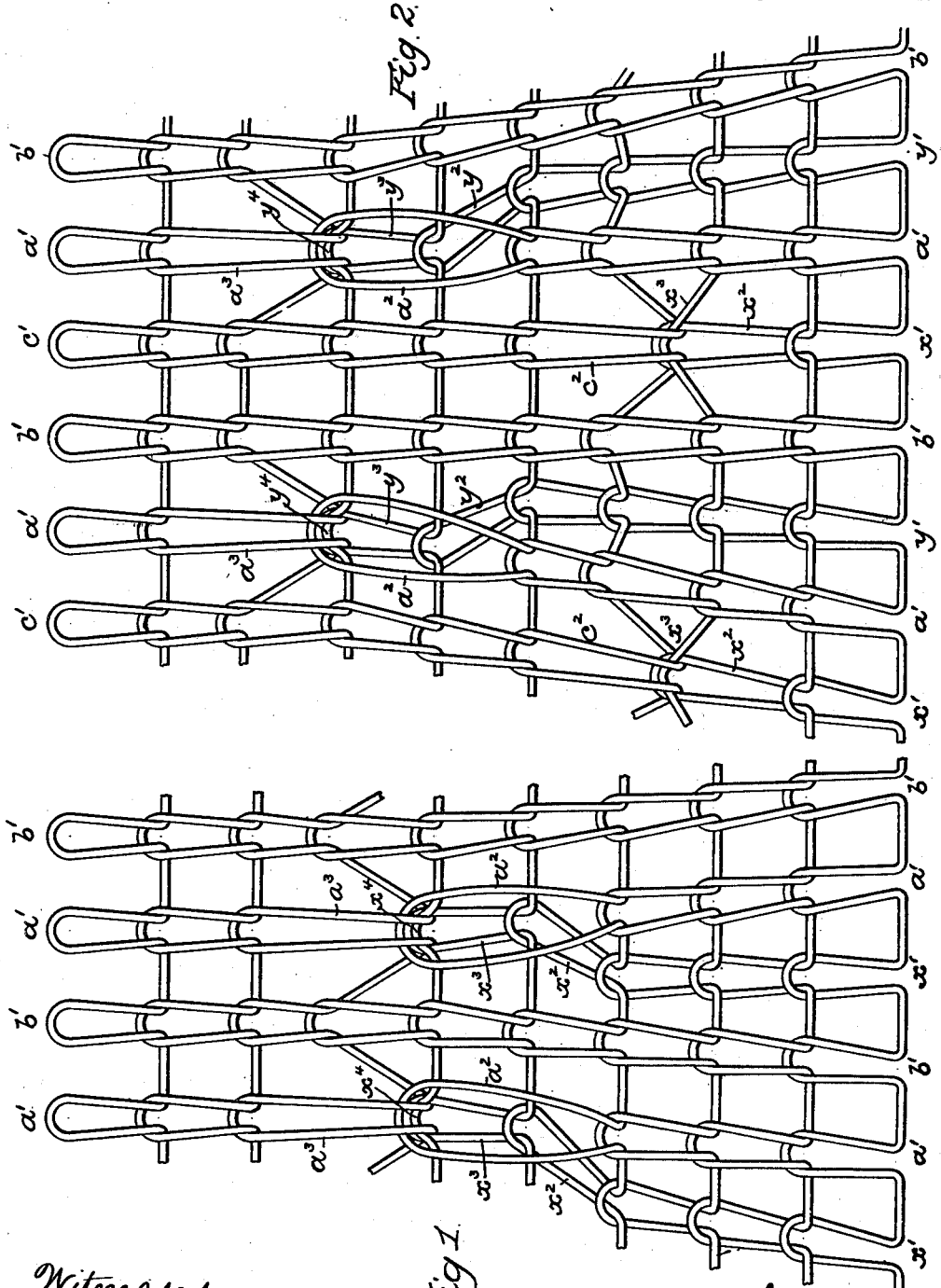

R. W. SCOTT.
KNITTED WEB.
APPLICATION FILED MAR. 24, 1909.

993,112.

Patented May 23, 1911.
4 SHEETS—SHEET 2.

Witnesses
Harry L. Smith
Hamilton D. Turner

Inventor
Robert W. Scott
by his Attorneys
Smith

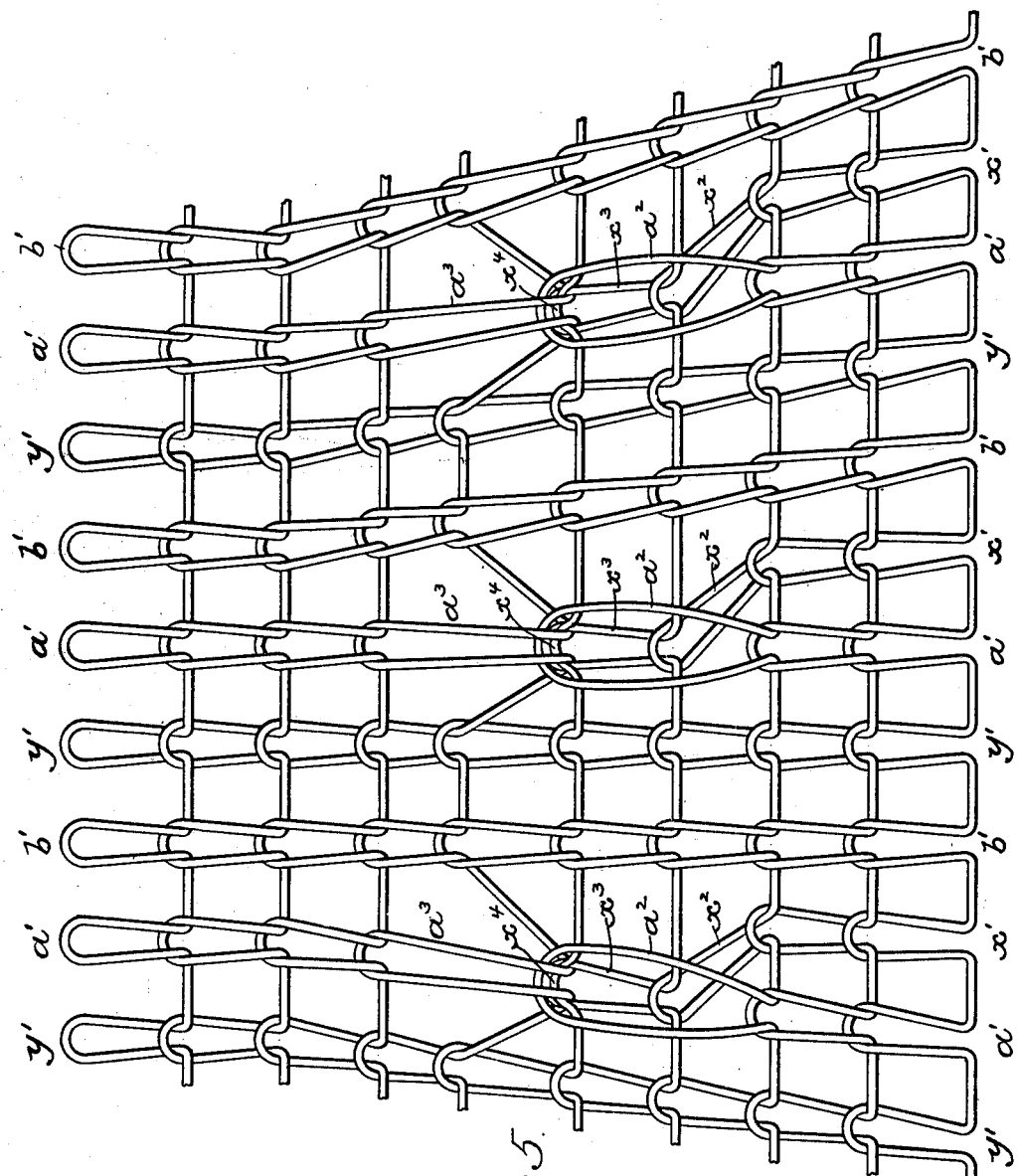

R. W. SCOTT.
KNITTED WEB.
APPLICATION FILED MAR. 24, 1909.

993,112.

Patented May 23, 1911.
4 SHEETS—SHEET 4.

Witnesses
Harry L. Smith
Hamilton D. Turner

Inventor
Robert W. Scott
by his Attorneys
Smith

UNITED STATES PATENT OFFICE.

ROBERT W. SCOTT, OF LEEDS POINT, NEW JERSEY, ASSIGNOR, BY DIRECT AND MESNE ASSIGNMENTS, TO SCOTT AND WILLIAMS, INCORPORATED, OF CAMDEN, NEW JERSEY, A CORPORATION OF NEW JERSEY.

KNITTED WEB.

993,112.   Specification of Letters Patent.   Patented May 23, 1911.

Application filed March 24, 1909. Serial No. 485,484.

*To all whom it may concern:*

Be it known that I, ROBERT W. SCOTT, a citizen of the United States, residing in Leeds Point, Atlantic county, New Jersey, have invented certain Improvements in Knitted Webs, of which the following is a specification.

My invention relates to knitted fabrics of that type which comprise webs, one having a greater number of wales than the other, some or all of the excess wales being doubled into adjoining standing wales. Instances of this type of fabric are those in which change is effected from ribbed web to plain web having a lesser number of wales than the ribbed web, or from one type of ribbed web to another type of ribbed web having a lesser number of wales than the first.

Hitherto the change from the web having the greater number of wales, to that having the lesser number has been effected by laterally displacing a stitch of each wale which is to be dropped and interknitting said laterally displaced stitch with a stitch of the adjoining standing wale, but this method is objectionable because a laterally displaced stitch does not present itself in the best position for the entrance of the needle to which it is to be transferred.

The object of my present invention has therefore been to overcome this objection in effecting such doubling transfers.

Figure 4:
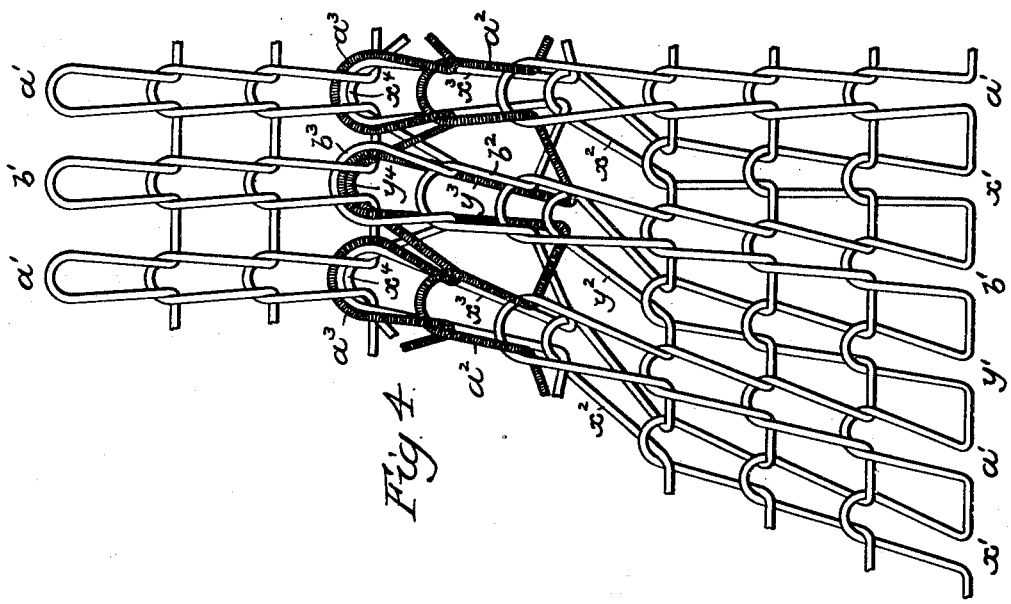
Figure 3:
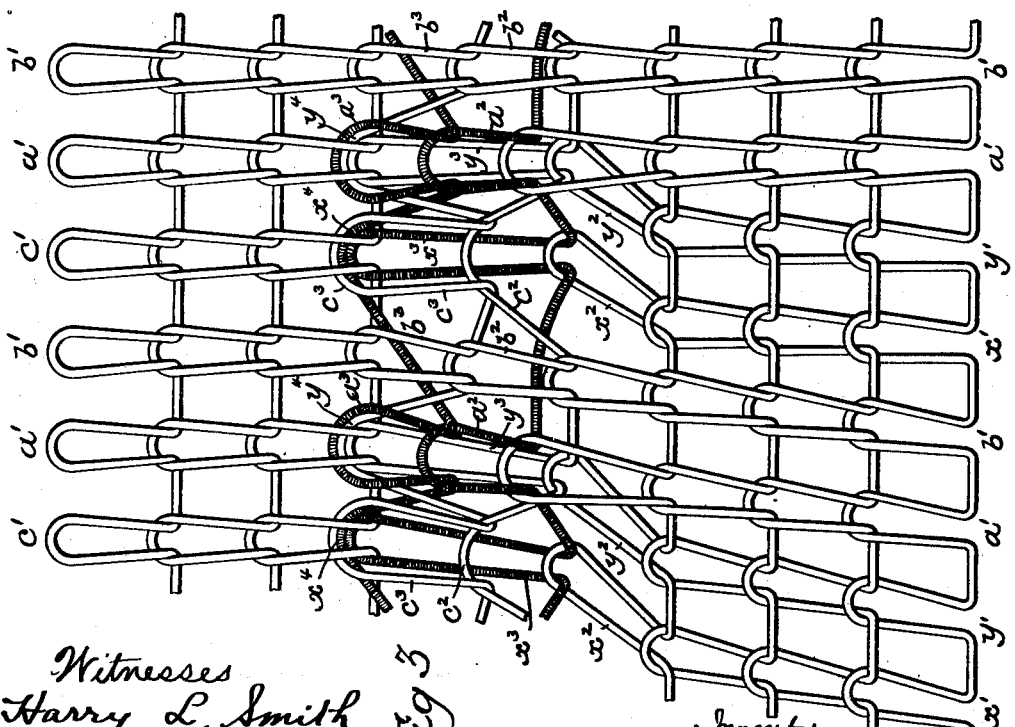
Figure 6:
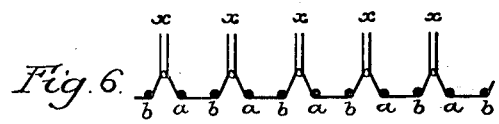
Figure 7:
Figure 8:
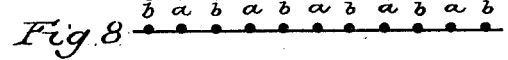
Figure 13:
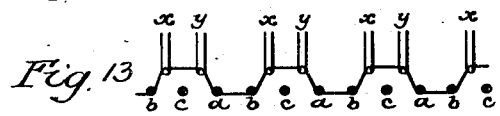
Figure 14:
Figure 15:
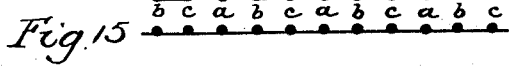
Figure 16:
Figure 17:
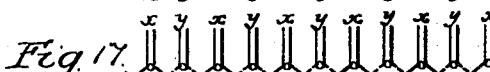
Figure 18:
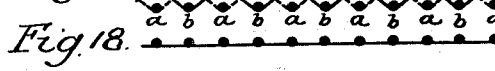

In the accompanying drawings Figure 1 is an exaggerated view of a piece of web knitted in accordance with my invention, and in which change is effected from two-and-one ribbed web to plain web having a lesser number of wales; Fig. 2 is an exaggerated view of a piece of web knitted in accordance with my invention, and in which change is effected from one-and-one ribbed web to plain web having a lesser number of wales; Fig. 3 is an exaggerated view of a piece of web knitted in accordance with my invention and in which a change is effected from two-and-two ribbed web to plain web having a lesser number of wales; Fig. 4 is an exaggerated view of a piece of web in which change is effected in a manner somewhat similar to that represented in Fig. 3, but from one-and-one ribbed web to plain web having a lesser number of wales; Fig. 5 is an exaggerated view of a piece of web in which change is effected in accordance with my invention from one-and-one ribbed web to two-and-one ribbed web having a lesser number of wales; Figs. 6, 7 and 8 are diagrammatic representations of the different dispositions of the needles resorted to in knitting the web shown in Fig. 1; Figs. 9, 10, 11 and 12 are diagrammatic representations of the different dispositions of the needles resorted to in knitting the web shown in Fig. 2; Figs. 13, 14 and 15 are diagrammatic representations of the different dispositions of the needles resorted to in knitting the web shown in Fig. 3; Figs. 16, 17 and 18 are diagrammatic representations of the different dispositions of the needles resorted to in knitting the web shown in Fig. 4, and Figs. 19, 20 and 21 are diagrammatic representations of the different dispositions of the needles resorted to in knitting the web shown in Fig. 5.

My invention can be practiced upon any type of rib knitting machine provided with means for shogging needles of one set in respect to those of the other set so as to cause the needles of the two sets to assume, at different stages of the knitting operation, different relations to one another, and also provided with means for transferring stitches from needles of one set to needles of the other set, and with means for independent control of the needles in the manner hereinafter set forth.

Usually my invention will be practiced in connection with a circular rib knitting machine having the needles for producing plain web contained in the cylinder and the ribbing needles contained in the dial, hence for convenience, I will, in my specification and claims, refer to the plain web needles as "cylinder" needles and to the ribbing needles as "dial" needles, without, however, intending thereby to limit myself to a machine of this type. As an instance of a machine, which, without much change, is adapted to the carrying out of my present invention I may refer to that forming the subject of my Letters Patent No. 834,763, dated October 30th, 1906.

The main difference between my present invention and previous inventions of its class which I have devised is that it is not the shogged stitch which is interknitted with the standing wale but a subsequently produced stitch, the object being to permit the stitch which is actually transferred to be drawn out straight over the receiving needle instead of being pulled diagonally across the same, as it must be when the transferred stitch is the shogged stitch.

Usually the change in the character of the web will be effected by doubling wales of a ribbed web into adjoining wales of said web which continue as wales of a plain web, and after the shogging of the dial needles upon which the wales to be doubled have been produced, one or more, and preferably a plurality of stitches are formed upon each of said dial needles while the same occupy their new relations to the cylinder needles and before effecting the transfer of the stitches from the dial needles to the cylinder needles.

In the web shown in Fig. 1, $a'$ and $b'$ represent standing wales continued throughout both the ribbed web and the plain web, and $x'$ the wales which appear only in the ribbed web, the wales $b'$ continuing unchanged and the wales $a'$ having the rib wales $x'$ doubled into the same. In producing this web the two-and-one rib portion is formed by knitting upon the cylinder needles $a$, $b$, and dial needles $x$ in the manner shown in Fig. 6, and the dial needles $x$ are then shogged into line with the cylinder needles $a$, as shown in Fig. 7, and one or more, in this case two, courses of one-and-one ribbed web are produced upon the needles $b$ and $x$, while the needles $a$ are temporarily retired from action but permitted to retain the stitches last formed upon them. After the two courses of one-and-one ribbed web have been produced, the stitches are transferred from the dial needles $x$ onto the cylinder needles $a$, the dial needles being then retired from action and plain web being produced upon the cylinder needles only, as shown in Fig. 8.

In the web shown in Fig. 1, $a^2$ represent the suspended stitches held by the needles $a$ while said needles were out of action, $x^2$ represent the laterally displaced stitches formed by shogging the dial needles $x$, $x^3$ represent the first stitches formed upon the dial needles in their new relation, and $x^4$ the second stitches formed upon said dial needles in such new relation, the dial needles, in effecting the transfer, being projected to such an extent as to draw into line with the cylinder needles $a$, the stitches $x^3$ of the course preceding that actually carried by said dial needles and both stitches $x^3$ and $x^4$ being cast from the dial needles and caught by the cylinder needles $a$ when said dial needles are retired, this having been found in practice to be the best method of effecting the transfer, although in carrying out my invention it is not absolutely necessary to resort to this method, as but one course of one-and-one ribbed web may be formed upon the needles $b$ and $x$ when they occupy the relation to each other shown in Fig. 7, the stitches upon the dial needles $x$ being then transferred to the corresponding cylinder needles $a$, and the same is true of the other forms of web which I have devised and which will be hereinafter described. In either case the stitch to be transferred will, on the projection of the dial needle, be drawn out directly over the receiving cylinder needle, there being no tendency to lateral deflection of said projected stitch because the stitch upon the cylinder needle $b$ on each side of the dial needle exercises the same degree of lateral pull upon the stitch on said dial needle. The doubling effected in a web of this character is what is known as a fifty per-cent.-doubling, there being fifty per-cent. more wales in the ribbed portion of the web than in the plain portion of the same.

Figure 9:
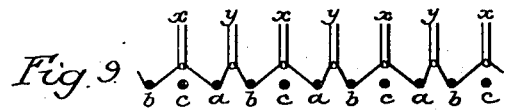
Figure 10:
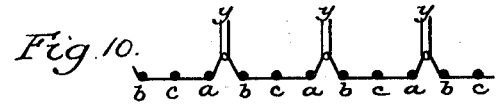
Figure 11:
Figure 12:
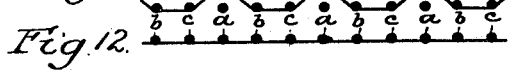

In the web shown in Fig. 2 change is effected from a one-and-one ribbed web to a plain web, $a'$ and $b'$ representing standing wales which are continued throughout both the ribbed web and the plain web, $x'$ representing wales which are rib wales in the ribbed web, and plain wales in the plain web, and $y'$ representing wales which are present only in the ribbed web, the standing wales $b'$ continuing without change, the rib wales $y'$ being doubled into the standing wales $a'$, and the rib wales $x'$ being changed to plain web wales $c'$. In producing a web of this character the one-and-one ribbed web is first knitted upon a cylinder needle $a$, a dial needle $x$, a cylinder needle $b$, a dial needle $y$, and so on, the dial needles $y$ being located between the cylinder needles $a$ and $b$, and the dial needles $x$ being in line with the cylinder needles $c$ which are empty and out of action, as shown in Fig. 9. The dial needles $x$ are manipulated so as to transfer their stitches to the cylinder needles $c$, said transfer being, by preference, a preceding course transfer, as before described, and one or more courses of three-and-one rib may then be knitted upon the cylinder needles $a$, $b$, $c$, and dial needles $y$, as represented in Fig. 10. The dial needles $y$ are then shogged into line with the cylinder needles $a$ and one or more courses of two-and-one ribbed web are then knitted upon the cylinder needles $b$ and $c$ and the dial needles $y$, the cylinder needles $a$ being temporarily retired from action but retaining their stitches, as represented in Fig. 11. One course will be sufficient if the stitches upon the dial needles are to be transferred but at least two courses being knitted if the transfer is to be from a course preceding that upon the dial needles. The transfer from the dial needles $y$ to the cylinder needles $a$ is then effected, the dial needles are retired from action, and plain web is produced upon the cylinder needles $a$, $b$, $c$, as represented in Fig. 2.

In the web shown in Fig. 2, $x^2$ and $x^3$ represent the stitches which are transferred from each dial needle $x$ to the corresponding cylinder needle $c$; $c^2$ represent the stitches of the first course drawn upon said cylinder needles $c$; $y^2$ represent the laterally displaced stitches carried by the dial needles $y$ at the time they were shogged into line with the cylinder needles $a$; $y^3$ and $y^4$ represent the stitches transferred to the cylinder needles $a$; $a^2$ represent the suspended stitches carried by the cylinder needles $a$, and $a^3$ represent the first stitches drawn by said cylinder needles $a$ after the transfer of the dial needle stitches thereto has been effected. In this web a thirty-three-and-one-third per-cent. doubling is effected, the ribbed web having thirty-three-and-one-third per-cent. more wales than the plain web.

In the web shown in Fig. 3 change from a two-and-two ribbed web to a plain web is effected in a manner somewhat different from that resorted to in producing the web shown in Figs. 1 and 2. In Fig. 3, $a'$ and $b'$ represent the standing wales which continue throughout both the ribbed and plain webs, $x'$ represent wales which are rib wales in the ribbed web and plain wales in the plain web, and $y'$ represent wales which appear only in the ribbed web, the wale $b'$ being the same throughout, the rib wale $y'$ being doubled into the standing wale $a'$, and the rib wale $x'$ being doubled into a freshly started plain web wale $c'$. In producing the two-and-two ribbed portions of this web the needles are disposed as shown in Fig. 13, the web being produced upon the cylinder needles $a$ and $b$, and upon the intervening dial needles $x$ and $y$, empty and inactive cylinder needles $c$ being interposed between the dial needles $x$ and $y$ of each pair. The first step in the transfer operation is to shog the needles $x$ and $y$ into line respectively with the needles $c$ and $a$, as shown in Fig. 14, and two independent and interlocked ribbed webs are then produced, one a one-and-one rib upon the needles $x$ and $a$, and the other a two-and-one rib, upon the needles $b$, $c$, and $y$. By preference two of each of these independent courses are thus knitted, and the stitches upon the needles $y$ as well as the stitches of the preceding course are then transferred to the needles $a$ and the like stitches are transferred from the needles $x$ to the needles $c$, the needles $x$ and $y$ being then retired from action and plain web knitted upon the cylinder needles $a$, $b$ and $c$, as shown in Fig. 15. In the web shown in Fig. 3, $x^2$ and $y^2$ represent the stitches upon the needles $x$ and $y$ at the time they are shogged; $x^3$ and $y^3$ stitches of the first course knitted upon the needles $x$ and $y$ in their new relation, $x^4$ and $y^4$ stitches of the second course produced upon said needles $x$, $y$ in such new relation, and $c^2$, $c^3$, $a^2$, $a^3$ and $b^2$, $b^3$ respectively the first and second stitches formed upon the needles $c$, $a$ and $b$ in the new relation, both stitches $x^3$ and $x^4$ being transferred to the needles $c$, and both stitches $y^3$ and $y^4$ being transferred to the needles $a$ preparatory to the production of plain web. In this web a thirty-three-and-one-third per-cent. doubling is effected.

In the web shown in Fig. 4, a somewhat similar method of transfer is adopted in connection with a web in which change is effected from a one-and-one ribbed web to a plain web. In this web $a'$ and $b'$ represent the standing wales which continue throughout both the ribbed and plain webs, and $x'$ and $y'$ the wales which appear only in the ribbed web, the wales $x'$ being doubled into the standing wales $a'$ and the wales $y'$ being doubled into the standing wales $b'$. In producing this web the dial needles primarily alternate in regular order with the cylinder needles, as shown in Fig. 16, and ordinary one-and-one ribbed web is produced upon the needles while they are in such relation. The first step in the transfer operation is to shog the dial needles, so that the needles $x$ will be in line with the cylinder needles $a$, and the needles $y$ will be in line with the cylinder needles $b$, as shown in Fig. 17, and two independent and interlocked ribbed webs are then produced, a course of one-and-one ribbed web being first knitted upon the needles $b$ and $x$, and a course of one-and-one ribbed web being then knitted upon the needles $a$ and $y$, as shown in Fig. 17, each of these courses being then, by preference, followed by a second course, after which, the needle stitches and those just preceding them are transferred from the needles $x$ to the needles $a$, and from the needles $y$ to the needles $b$, the needles $x$ and $y$ being then retired from action and plain web being produced upon the cylinder needles $a$ and $b$ as indicated in Fig. 18. This produces a web in which there is one-hundred per-cent. doubling, there being twice as many wales in the ribbed web as in the plain web. In Fig. 4 the stitches are designated in the same manner as in Fig 3.

Figure 19:
Figure 20:
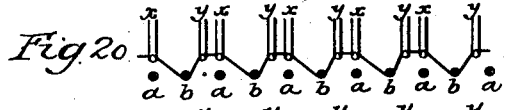
Figure 21:
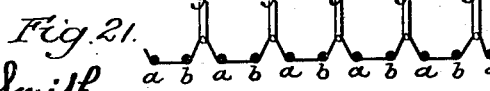

In the web shown in Fig. 5 change is effected from a one-and-one ribbed web to a two-and-one ribbed web, $a'$, $b'$ and $y'$ representing the standing wales which continue throughout both webs, and $x'$ representing the wales which appear only in the one-and-one ribbed web, the wales $b'$ and $y'$ continuing without change and the wales $x'$ being doubled into the wales $a'$. In producing this web the needles are primarily disposed as shown in Fig. 19, the dial needles alternating with the cylinder needles and one-and-one ribbed web being produced in the manner shown in said figure. The first step in the transfer operation is to shog the dial needles $x$ into line with the cylinder needles $a$ and to temporarily retire the latter needles from action but permit them to retain their stitches, two courses of one-and-two ribbed web being then knitted upon the cylinder needles $b$ and the dial needles $x$ and $y$, as shown in Fig. 20, and the needle stitches and those of the next preceding course being then transferred from the dial needles $x$ to the cylinder needles $a$, the dial needles $x$ retired from action, and two-and-one ribbed web then produced upon the cylinder needles $a$ and $b$ and dial needles $y$, as shown in Fig. 21.

In Fig. 5 the stitches are designated the same as in Fig. 1.

In all of the forms of web which I have shown and described the stitches transferred from the dial needles to the cylinder needles are subsequent to the laterally displaced stitches caused by the shogging of the dial needles, and each transfer is what I term a "straight" transfer, caused by a direct outward movement of the transferring needle over the receiving needle instead of the ordinary doubling transfer effected by a compound movement of the transferring needle so as to draw a shogged or laterally deflected stitch into position to be engaged by the receiving needle. In all of the webs shown and described, moreover, the change from one extreme character of web to the other is effected through the medium of an intermediate web of a character different from that of either of the webs between which it is interposed, and knitted upon a different arrangement of needles, thus in the web shown in Fig. 1, the change from two-and-one ribbed web to plain web is effected through the intervention of an interposed one-and-one ribbed web, while in the web shown in Fig. 2 change from one-and-one-ribbed web to plain web is effected first by shifting to a three-and-one ribbed web and then to a two-and-one ribbed web. In the web shown in Fig. 3 the change from two-and-two ribbed web to plain web is effected through the intervention of two independent webs, one a two-and-one ribbed web and the other a one-and-one ribbed web, while in the web shown in Fig. 4, change from one-and-one ribbed web to plain web is effected through the intervention of two independent one-and-one ribbed webs, and in the web shown in Fig. 5 the change from one-and-one ribbed web to two-and-one ribbed web is effected through the intervention of a one-and-two ribbed web. By reason of the plurality of courses of stitches contained in the intervening web, the reduction in the width or diameter of the web is effected less abruptly than when the shogged stitches are directly transferred.

It will be understood that for the better showing of the structure and arrangement of some of the stitches of the various fabrics which I have illustrated in the drawings, others of said stitches have been lengthened, spread, or otherwise distorted or misplaced, as compared with their character and position in the actual fabrics. The transferred stitches $x^4$ and $y^4$ do not show as full stitches for the reason that after they have been cast off from the transferring needles they are free to be drawn through the stitches $x^3$ or $y^3$ and into engagement with the new stitches. I have, however, for convenience referred to them as "stitches."

I do not herein claim the fabrics shown in Figs. 3 and 4 or the method of making same, as these form the subject of a separate application filed by me on the eighth day of April, 1909, Serial No. 488,543.

I claim:—

1. A knitted fabric having main webs, one with more wales than the other, the excess wales being doubled into adjoining standing wales and having stitches in line with said standing wales.

2. A knitted fabric having main webs, one with more wales than the other, each of the excess wales being doubled into an adjoining standing wale, and having a plurality of stitches in line with said standing wale.

3. A knitted fabric having main webs, one with more wales than the other, the excess wales being doubled into adjoining standing wales in an intervening web having the greater number of wales but having some of said wales in different relation to the others than in the corresponding main web.

4. A knitted fabric having main webs, one with more wales than the other, the excess wales being doubled into adjoining standing wales in an intervening web having throughout a plurality of courses, a different arrangement of wales than that in either of the main webs.

5. A knitted fabric having main webs, one with more wales than the other, the excess wales being doubled into adjoining standing wales and having stitches in line with suspended stitches in said standing wales.

6. A knitted fabric having main webs, one with more wales than the other, and an intervening web with excess wales having straight stitches doubled into adjoining standing wales.

7. A knitted fabric having main webs, one with more wales than the other, and an intervening web with excess wales having a plurality of straight stitches doubled into an adjoining standing wale.

8. A knitted fabric having main webs, one with more wales than the other, and an intervening web with excess wales having stitches shogged into line with adjoining standing wales, and having subsequent stitches interknitted with said standing wales.

9. A knitted fabric having main webs, one with more wales than the other, and an intervening web with excess wales each having a stitch shogged into line with an adjoining standing wale, and having a plurality of subsequent stitches interknitted with said standing wale.

10. A knitted fabric having main webs, one with more wales than the other, and an intervening web, some of the wales of the larger web which are continued into the smaller web having the direction of their stitches reversed, and excess wales having straight stitches doubled into adjoining standing wales in the intervening web.

11. A knitted fabric having main webs, one with more wales than the other, and an intervening web, some of the wales of the larger web which are continued into the smaller web having the direction of their stitches reversed, and each of the excess wales having a plurality of straight stitches doubled into an adjoining standing wale in the intervening web.

12. A knitted fabric having main webs, one ribbed and one plain, the ribbed web having more wales than the plain web, and an intervening web having excess wales doubled into adjoining standing wales and having stitches in line with said standing wales.

13. A knitted fabric having main webs, one ribbed and one plain, the ribbed web having more wales than the plain web, and an intervening web having each of the excess wales doubled into an adjoining standing wale, and having a plurality of stitches in line with said standing wale.

14. A knitted fabric having main webs, one ribbed and one plain, the ribbed web having more wales than the plain web, and an intervening web having excess wales doubled into adjoining standing wales in an intervening web having the same number of wales as the ribbed web but having some of said wales in different relation to the others than in the corresponding main web.

15. A knitted fabric having main webs, one ribbed and one plain, the ribbed web having more wales than the plain web, and an intervening web having excess wales doubled into adjoining standing wales in an intervening web having throughout a plurality of courses, a different arrangement of wales than that in either of the main webs.

16. A knitted fabric having main webs, one ribbed and one plain, the ribbed web having more wales than the plain web, and an intervening web having standing wales some with suspended stitches and excess wales doubled into adjoining standing wales and having stitches in line with suspended stitches in said standing wales.

17. A knitted fabric having main webs, one ribbed and one plain, the ribbed web having more wales than the plain web, and an intervening web having standing wales some with suspended stitches each of the excess wales doubled into an adjoining standing wale, and having a plurality of stitches in line with a suspended stitch in said standing wale.

18. A knitted fabric having main webs, one ribbed and one plain, the ribbed web having more wales than the plain web, and an intervening web containing the excess wales and having straight stitches doubled into adjoining standing wales.

19. A knitted fabric having main webs, one ribbed and one plain, the ribbed web having more wales than the plain web, and an intervening web containing each of the excess wales and having a plurality of straight stitches in each of said excess wales doubled into an adjoining standing wale.

20. A knitted fabric having main webs, one ribbed and one plain, the ribbed web having more wales than the plain web, and an intervening web with excess wales having stitches shogged into line with adjoining standing wales, and having subsequent stitches interknitted with said standing wales.

21. A knitted fabric having main webs, one ribbed and one plain, the ribbed web having more wales than the plain web, having an intervening web with each of the excess wales having a stitch shogged into line with an adjoining standing wale, and having a plurality of subsequent stitches interknitted with said standing wale.

22. A knitted fabric having main webs, one ribbed and one plain, and an intervening web, the ribbed web having more wales than the plain web, some of the wales of the ribbed web which are continued into the plain web having the direction of their stitches reversed, and excess wales having straight stitches doubled into adjoining standing wales in the intervening web.

23. A knitted fabric having main webs, one ribbed and one plain, and an intervening web, the ribbed web having more wales than the plain web, some of the wales of the ribbed web which are continued into the plain web having the direction of their stitches reversed, and each of the excess wales having a plurality of straight stitches doubled into an adjoining standing wale in the intervening web.

24. The mode herein described of effecting reduction in the number of wales in a knitted web, said mode consisting in first knitting the web with the greater number of wales with alternating stitches some facing one direction and others in the opposite direction, shogging stitches of wales of one face of the web into line with wales of the other face of the web, then drawing further stitches in said shogged wales in their new relation, and then interknitting stitches of said shogged wales with stitches of the corresponding wales of the other face of the web.

25. The mode herein described of effecting reduction in the number of wales in a knitted web, said mode consisting in first knitting the web with the greater number of wales with alternating stitches some facing one direction and others in the opposite direction, shogging stitches of wales of one face of the web into line with wales of the other face of the web, then drawing further stitches in said shogged wales in their new relation while stitches of the corresponding wales of the other face of the web are held up, and then interknitting stitches of said shogged wales with stitches of the corresponding wales of the other face of the web.

26. The mode herein described of effecting reduction in the number of wales in a knitted web, said mode consisting in first knitting the web with the greater number of wales with alternating stitches some facing one direction and others in the opposite direction, shogging stitches of wales of one face of the web into line with wales of the other face of the web, then drawing further stitches in said shogged wales in their new relation, then interknitting stitches of said shogged wales with stitches of the corresponding wales of the other face of the web, and then continuing the knitting by drawing stitches in wales of the latter face of the web only.

27. The mode herein described of effecting reduction in the number of wales in a knitted web, said mode consisting in first knitting the web with the greater number of wales with alternating stitches some facing one direction and others in the opposite direction, shogging stitches of wales of one face of the web into line with wales of the other face of the web, then drawing further stitches in said shogged wales in their new relation while stitches of the corresponding wales of the other face of the web are held up, then interknitting stitches of said shogged wales with stitches of the corresponding wales of the other face of the web, and then continuing the knitting by drawing stitches in wales of the latter face of the web only.

28. The mode herein described of changing the character of a knitted web from one having a greater number of wales to one having a lesser number of wales, said mode consisting in knitting the web with the greater number of wales with alternating stitches some facing in one direction and others in the opposite direction, shogging stitches of wales of one face of the web into line with wales of the other face of the web, drawing stitches in each of the shogged wales in their new relation, and then interknitting a plurality of stitches of each of said shogged wales with stitches of corresponding wales of the other face of the web.

29. The mode herein described of changing the character of a knitted web from one having a greater number of wales to one having a lesser number of wales, said mode consisting in knitting the web with the greater number of wales with alternating stitches some facing in one direction and others in the opposite direction, shogging stitches of wales of one face of the web into line with wales of the other face of the web, drawing stitches in each of the shogged wales in their new relation while the stitches of the corresponding wales of the other face of the web are held up, and then interknitting a plurality of stitches of each of said shogged wales with stitches of corresponding wales of the other face of the web.

30. The mode herein described of changing the character of a knitted web from one having a greater number of wales to one having a lesser number of wales, said mode consisting in knitting the web with the greater number of wales with alternating stitches some facing in one direction and others in the opposite direction, shogging stitches of wales of one face of the web into line with wales of the other face of the web, drawing stitches in each of the shogged wales in their new relation, then interknitting a plurality of stitches of each of the shogged wales with stitches of corresponding wales of the other face of the web, and then continuing the knitting by drawing the stitches in wales of the latter face of the web only.

31. The mode herein described of changing the character of a knitted web from one having a greater number of wales to one having a lesser number of wales, said mode consisting in knitting the web with the greater number of wales with alternating stitches some facing in one direction and others in the opposite direction, shogging stitches of wales of one face of the web into line with wales of the other face of the web, drawing stitches in each of the shogged wales in their new relation while the stitches of the corresponding wales of the other face of the web are held up, then interknitting a plurality of stitches of each of the shogged wales with stitches of corresponding wales of the other face of the web, and then continuing the knitting by drawing the stitches in wales of the latter face of the web only.

In testimony whereof, I have signed my name to this specification, in the presence of two subscribing witnesses.

ROBERT W. SCOTT.

Witnesses:
HAMILTON D. TURNER,
KATE A. BEADLE.